United States Patent Office 3,212,083
Patented Oct. 12, 1965

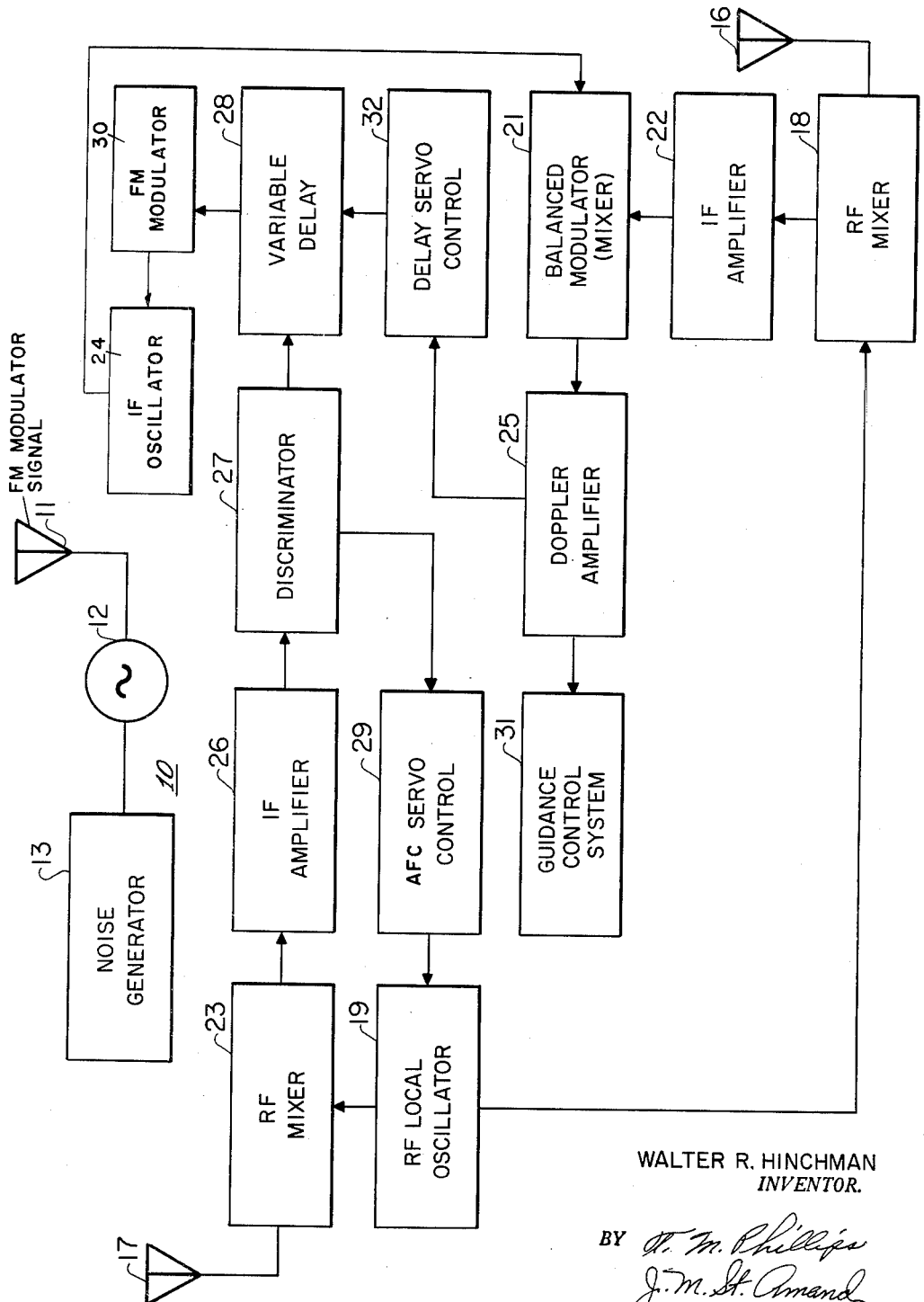

3,212,083
GATING SYSTEM FOR SEMI-ACTIVE MISSILE GUIDANCE WHICH ALLOWS SIGNALS OF PREDETERMINED VELOCITY AND RANGE TO ENTER
Walter R. Hinchman, Riverside, Calif., assignor to the United States of America as represented by the Secretary of the Navy
Filed July 28, 1961, Ser. No. 128,343
2 Claims. (Cl. 343—7.3)
(Granted under Title 35, U.S. Code (1952), sec. 266)

The invention herein described may be manufactured and used by or for the Government of the United States of America for governmental purposes without the payment of any royalties thereon or therefor.

The present invention relates to a semi-active range gate and more particularly to a semi-active range gate utilizing random frequency modulation and variable delay.

Various guidance system have been developed which employ velocity gating or target lock-on to discriminate against unwanted targets. Velocity gating along is incapable of discriminating against multiple targets having the same velocity but different ranges. Similarly systems have been developed which employ range gating but these are susceptible to false information from sea return, chaff or other targets having different velocities but at the same range as a desired target or at multiples of this range. Previous technique of obtaining velocity and range gates have been so different that combining the two into a single package to obtain the desired characteristics of both would necessitate such complexity as to render it impractical.

Accordingly an object of the present invention is to provide a novel gating system for semi-active missile guidance which will enable the guidance system to obtain greater immunity from false information generated by unwanted targets.

Another object of the invention is the provision of a novel gating system for semi-active missile guidance in which a desired target is gated in both velocity and range.

A further object of the invention is to provide a novel gating system for semi-active missile guidance in which a desired target is gated in both velocity and range which is simple in construction and yet retains the desired characteristics of each system operating individually.

Other objects and many of the attendant advantages of this invention will become readily appreciated as the same becomes better understood by reference to the following detailed description when considered in connection with the accompanying drawings.

Referring now to the drawings there is shown a block diagram of a gating system embodying the present invention. An illuminating radar 10 having a transmitting antenna 11 supplied by an illuminating signal from oscillator 12 that is frequency modulated with random noise from noise source 13 illuminates a target to be tracked.

The range gate, located in the missile, includes a front antenna 16 for receiving reflected signals from a target and a rear anntenna 17 for receiving the illuminating signal directly from the illuminating radar 10. Front antenna 16 is fed into RF mixer 18 which has an input coupled to RF local oscillator 19. The output of RF mixer 18 is coupled to balanced modulator 21 through IF amplifier 22. Rear antenna 17 is fed into RF mixer 23 which also has an input coupled to RF local oscillator 19. The output of RF mixer 23 is coupled to IF oscillator 24 through IF amplifier 26, discriminator 27, variable delay 28 and FM modulator 30. Coupled to discriminator 27 is AFC servo control 29 for controlling the output of local oscillator 19. The output of IF oscillator 24 is coupled as a second input to balanced modulator 21. The output of doppler amplifier 25 is coupled as the input to a guidance control system 31. Also coupled to the output of doppler amplifier 25 is a delay servo control 32 for controlling the variable delay 28. Discriminator 27 may be of any of the well known types, as for example, the discriminator shown and discussed in section 11–15, Circuit Theory of Electron Devices by E. M. Boone; John Wiley & Sons, 1953. Balanced modulator 21 may be of the type shown and described in section 3–4, Information Transmission, Modulation, and Noise by M. Schwartz; McGraw Hill, 1959. Doppler amplifier 25 may be of the audio amplifier type, as for example the National Bureau of Standards preferred circuit No. 60. Variable delay 28 and delay servo control 32 may be of any of the well known types as for example, the servo-controlled magnetic-tape delay line shown and described on p. 438 of "Instruments and Control Systems," March 1960.

In operation, illuminating radar 10 which is carried on the launching vehicle is frequency modulated with random noise 13. The signal from antenna 11 is beamed at a target from which it is reflected into the front antenna system 16 of the missile. Rear antenna 17 also receives the illuminating signal directly from antenna 11. Both front and rear signals are heterodyned to an IF frequency by the missile local oscillator 19. The output of IF amplifier 26 is fed to discriminator 27 which detects the noise modulation signal. This noise signal is then passed through variable delay 28 to FM modulator 30 which frequency modulates IF oscillator 24 operating at a center frequency that is the same as the output of RF mixer 23 and produces a signal which is effectively a delay version of the IF signal from RF mixer 23. The delayed IF signal is mixed with the IF output of amplifier 22 in balanced modulator 21. The nature of a balanced modulator or mixer is that there will be no output unless the two input signals are coincidental. The output of modulator 21 is fed to doppler amplifier 25 so that when the variable delay, $\tau_v$, is equal to the missile to target round trip transit time, $2d/c$, maximum correlation (maximum output of amplifier 25) of the two mixer inputs will result. The output signal from doppler amplifier 25 is coupled as one of the inputs to guidance control system 31 which may be for any of the typical missile-guidance control systems shown and described in chapter 16–2 of Guidance by A. S. Locke; D. Van Nostrand, 1955. The delay, $\tau_v$, is adjusted before launch for maximum correlation and is continuously adjusted by delay servo control 32 in response to the output signal from doppler amplifier 25. Since the autocorrelation of these two random signals decreases rapidly and monotonically as the delay difference $$\left(\tau_v - \frac{2d}{c}\right)$$

becomes other than 0, the desired target is thus maintained in a narrow range gate while targets at other ranges are rejected. Also, doppler information is available within this range gate for discriminating against targets within the range gate but having different velocities.

Obviously many modifications and variations of the present invention are possible in the light of the above teachings. If is therefore to be understood that within the scope of the appended claims the invention may be practiced otherwise than as specifically described.

What is claimed is:

1. In a semi-active range gate for use on a guided missile the combination comprising a first antenna mounted on the front of said missile for receiving a reflected random noise frequency modulated signal from a target to be intercepted, a second antenna mounted on the rear of said missile for receiving said random noise frequency modulated signal directly from an illuminating source, heterodyning means coupled to said first and second antennas for producing first and second intermediate frequencies respectively, discriminator means being coupled to said second heterodyning means for detecting said noise modulated signal, an oscillator operating at the same intermediate frequency as the output of said second heterodyning means, variable delay circuit means coupled to said detecting means and to said oscillator for coupling a delayed signal to frequency modulate said oscillator, a mixing circuit having a first input coupled to said first heterodyning means and a second input coupled to the output of said frequency modulated oscillator for producing an output signal proportional to the correlation of the input signals thereof, a delay servo control coupled to said variable delay circuit, circuit means for coupling the output of said mixer to said delay servo control for maintaining said variable delay at an optimum, and control circuit means coupled to the output of said mixer for utilizing the output thereof.

2. In a velocity and range gate for a semi-active guided missile, the combination comprising:
(a) first circuit means for generating a signal proportional to range,
(b) second circuit means for generating a signal proportional to velocity,
(c) balanced mixer circuit means having a first input coupled to said first circuit means and a second input coupled to said second circuit means for producing an output signal when the velocity signal and the range signal coincide,
(d) doppler amplifier means coupled to said balanced mixer for producing an output signal proportional to the closure rate between the target and said guided missile.

References Cited by the Examiner
UNITED STATES PATENTS
3,004,219 10/61 Albert _____ 343—8
FOREIGN PATENTS
724,555 2/55 Great Britain _____ 343—100.7

CHESTER L. JUSTUS, *Primary Examiner.*